United States Patent
Šmíd et al.

(10) Patent No.: US 10,343,337 B2
(45) Date of Patent: Jul. 9, 2019

(54) EXCHANGEABLE ULTRASONIC WELDING MODULE FOR WELDING LONGITUDINAL REINFORCING FOLDS IN PACKAGING FILM INSIDE PACKAGING MACHINE AND METHOD OF ITS USE

(71) Applicant: VELTEKO s.r.o., Vlašim (CZ)

(72) Inventors: František Šmíd, Vlašim (CZ); Miloslav Zajíc, Vlašim (CZ); Roman Jiroušek, Vlašim (CZ)

(73) Assignee: VELTEKO s.r.o., Vlasim (CZ)

( * ) Notice: Subject to any disclaimer, the term of this patent is extended or adjusted under 35 U.S.C. 154(b) by 0 days.

(21) Appl. No.: 15/969,856

(22) Filed: May 3, 2018

(65) Prior Publication Data

US 2018/0319089 A1    Nov. 8, 2018

(30) Foreign Application Priority Data

May 4, 2017  (CZ) ...................... 2017-251

(51) Int. Cl.
*B32B 37/00* (2006.01)
*B29C 65/08* (2006.01)
*B29C 65/00* (2006.01)

(52) U.S. Cl.
CPC ............ *B29C 65/08* (2013.01); *B29C 66/849* (2013.01)

(58) Field of Classification Search
CPC ....... B29C 65/08; B29C 66/849; B29C 66/80; B65B 51/225
USPC ...................................... 156/73.1
See application file for complete search history.

(56) References Cited

U.S. PATENT DOCUMENTS

| 5,852,920 A | 12/1998 | Linkiewicz |
| 6,216,420 B1 | 4/2001 | Mazzetto et al. |
| 8,376,016 B2 * | 2/2013 | Hull ................. B29C 65/08 156/580.1 |

(Continued)

FOREIGN PATENT DOCUMENTS

| CZ | 20050691 A3 | 8/2007 |
| EP | 2522490 A2 | 11/2012 |
| EP | 2522493 A2 | 11/2012 |

(Continued)

OTHER PUBLICATIONS

Czech Republic Patent Application PV 2017-251, Search Opinion with Machine Translation dated Feb. 19, 2018.

(Continued)

*Primary Examiner* — James D Sells
(74) *Attorney, Agent, or Firm* — Erise IP, P.A.

(57) ABSTRACT

An exchangeable ultrasonic welding module contains an ultrasonic transducer assembly (4) with a horn (5) and an anvil (7). The module contains a member (1) provided with a guideway (8) in a mating guideway (18) on the frame (10) of a filling tube (14). A locking element (11) secures the member (1) and the frame (10) in a fixed position relative to each other. The member (1) is provided with an element (2) for linear motion of a sliding carriage (3) and an adjustable stop (6) for restricting the carriage movement (3). The ultrasonic transducer assembly (4) is firmly affixed to the carriage (3), whereas the anvil (7) is affixed to the member (1). The frame (10) may contain an adjustable stop (9) for locking the member (1) in a defined position as the member is inserted into the mating guideway (18).

4 Claims, 3 Drawing Sheets

(56) References Cited

Figure 1:
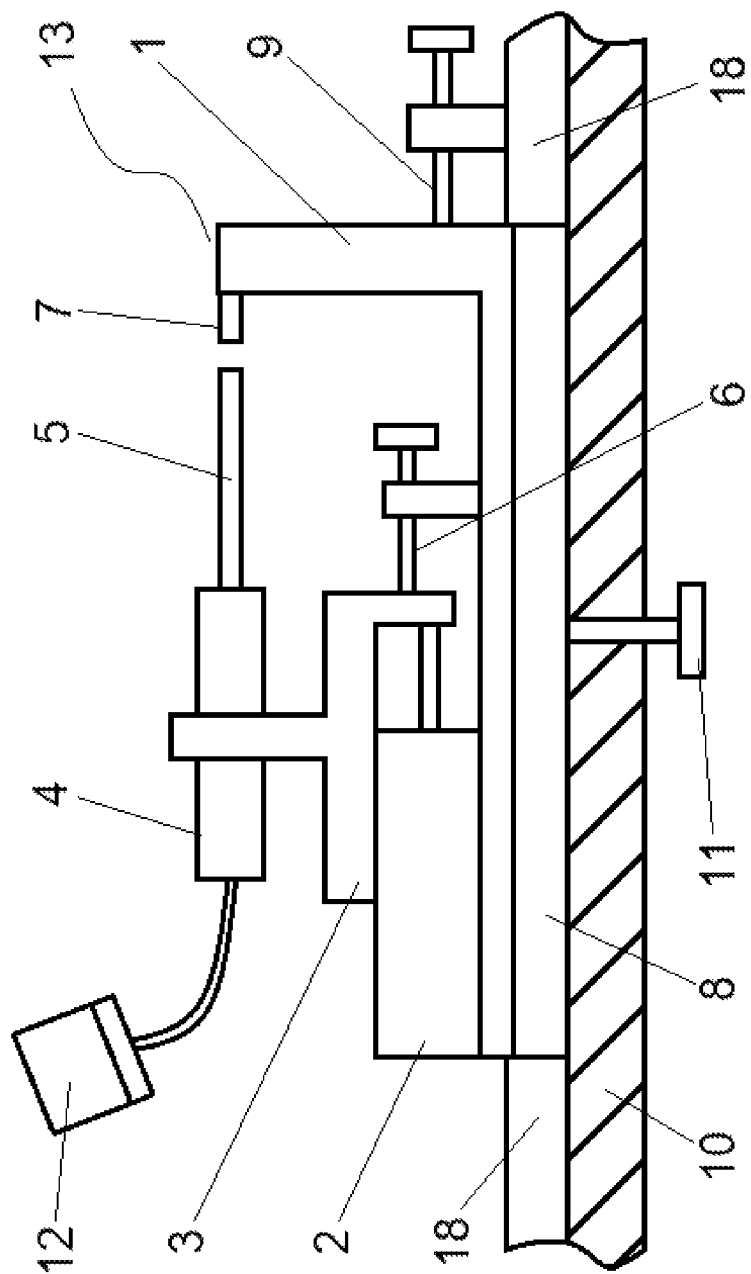

U.S. PATENT DOCUMENTS 8,591,679 B1 * 11/2013 Hull .................. B65D 25/00
                                                       156/580.1
9,149,980 B2 * 10/2015 Cham ................. B29C 65/08

FOREIGN PATENT DOCUMENTS

FR        2784051 A1    4/2000
JP        S59214612 A   12/1984
TW         267984 B     1/1996

OTHER PUBLICATIONS

Czech Republic Patent Application PV 2017-251, Search Report dated Feb. 20, 2018.
Danish Patent Application NO140153, Search Report and Opinion dated Oct. 23, 2018.
Czech Republic Patent Application PV 2017-251, Response to Search Opinion filed Apr. 20, 2018.

* cited by examiner

EXCHANGEABLE ULTRASONIC WELDING MODULE FOR WELDING LONGITUDINAL REINFORCING FOLDS IN PACKAGING FILM INSIDE PACKAGING MACHINE AND METHOD OF ITS USE

RELATED APPLICATION

This application claims priority to Czech Republic patent application CZ2017-251, filed May 4, 2017, the disclosure of which is incorporated herein by reference in its entirety.

FIELD

This invention relates to an exchangeable ultrasonic welding module for welding longitudinal reinforcing folds in packaging film inside packaging machine and to a method of its use. The invention belongs to a technical field involving machines, appliances or equipment for packaging products or commodities. The invention can be used with both vertical and horizontal form-fill-seal flat film packaging machines.

RELATED ART

Where products or commodities are packaged in tubular-shape sachets using packaging machines, a requirement often arises for reinforcing such sachets with longitudinal folds. Sachets with such folds effectively retain their shape. These sachets generally contain two, three or four longitudinal reinforcing folds.

In packaging machines, longitudinal reinforcing folds are shaped using forming elements and welded by means of electrically-heated welding modules or ultrasonic welding modules of various types.

An advantage of ultrasonic welding modules over electrically-heated devices is their small size. Consequently, their use in a form-fill-seal flat film packaging machine does not increase the machine's total installation height or the drop height of the product or commodity, which might otherwise pose a greater risk of damage to the product or commodity. Another advantage is that they are easy to arrange around the filling tube, which enables filling tubes with optimum cross-sections to be used, and thus eliminate problems with products or commodities clogging in the filling tube.

Disadvantages of ultrasonic welding devices include their higher price, the need for precise relative adjustment of welding tools, i.e. the horn and the anvil, and the need for precise positioning of said ultrasonic welding modules with respect to the filling tube and the forming elements. The solution according to this invention eliminates these disadvantages to a considerable extent.

SUMMARY

Embodiments of the invention include an exchangeable ultrasonic welding module for welding longitudinal reinforcing folds in packaging film inside a packaging machine. In particular, it relates to the design solution for said modules disposed around the filling tube and to the method of their use or, more specifically, the method of their exchange.

The exchangeable ultrasonic welding module contains a standard ultrasonic transducer assembly with a horn. The horn is oriented opposite an anvil and the path of the film to be welded passes between them. In this arrangement, the horn can be adjusted with repeatable precision with respect to the anvil, and therefore can operate trouble-free.

The module also contains a member provided with a guideway for guiding a sliding motion along one axis within the mating guideway provided on the filling tube frame. One particular embodiment of the mating guideway involves a shaped groove with one end open to allow the member's guideway of an analogous shape to slide in and out. The guideway of the member is inserted all the way into the mating guideway.

The member and/or the frame contain a locking element which secures the member and the frame in a fixed position relative to each other. The locking element may take the form of a screw or a clamping joint. The member is further provided with an element for linear motion of a sliding carriage and with an adjustable stop which restricts the movement of the carriage or, more specifically, defines its end position. The element for linear motion of the carriage may comprise, in particular, a pneumatic cylinder, a servo drive with a threaded rod, or a similar device. A less advantageous but functional solution involves a hand-operated device, e.g. a hand-operated threaded rod. The ultrasonic transducer assembly is firmly affixed to the carriage, whereas the anvil is affixed to the frame. Utilities are supplied to the module via a combined connector with a cable. The linear motion of the carriage with the ultrasonic transducer assembly with respect to the anvil is particularly desirable for repair tasks or for introducing new film. Thanks to the principle of ultrasonic welding, the module is not hot and there is no risk of undesirable damage to the film, thus it is not necessary to open the module after the end of welding.

Preferably, the frame contains an adjustable stop to secure the member in a defined position as the member is inserted in the mating guideway. This is important for achieving a correct position of the module with respect to the filling tube. If no adjustable stop is provided, the end of the mating guideway can determine the position of the inserted member. However, this is only possible when the contact surfaces of the guideway and its mating guideway (more specifically, the member and the frame) have been produced to great precision.

Such arrangement enables the exchangeable ultrasonic welding module to be adjusted with repeatable precision with respect to the filling tube and to the forming elements, and therefore enables its use with multiple filling tubes for producing various formats of sachets by the user. The specific arrangement of exchangeable ultrasonic welding modules around the filling tube and their number depends on the desired shape of the transverse cross-section of the sachet, on the transverse cross-section of the filling tube, and is outside the scope of this invention.

The above-described designs enable costly ultrasonic welding modules to be employed using a new and effective method according to the invention. This invention relates to a method of use of this exchangeable ultrasonic welding module or, more specifically, to a method of exchanging it between different filling tubes. The number of filling tubes is not limited. The procedure comprises the following steps:

removing a complete first filling tube, which is fitted with forming elements and exchangeable ultrasonic welding modules, from a packaging machine, unlocking the locking elements and sliding out the exchangeable ultrasonic welding modules from the mating guideway on the frame of the first filling tube, sliding the exchangeable ultrasonic welding modules all the way into the mating guideway on a second filling tube, placing the second filling tube, which is fitted with forming elements and exchangeable ultrasonic welding modules, into the packaging machine.

The stop in the mating guideway on the filling tube frame may preferably take the form of an adjustable stop.

BRIEF DESCRIPTION OF THE DRAWING FIGURES

Figure 2:
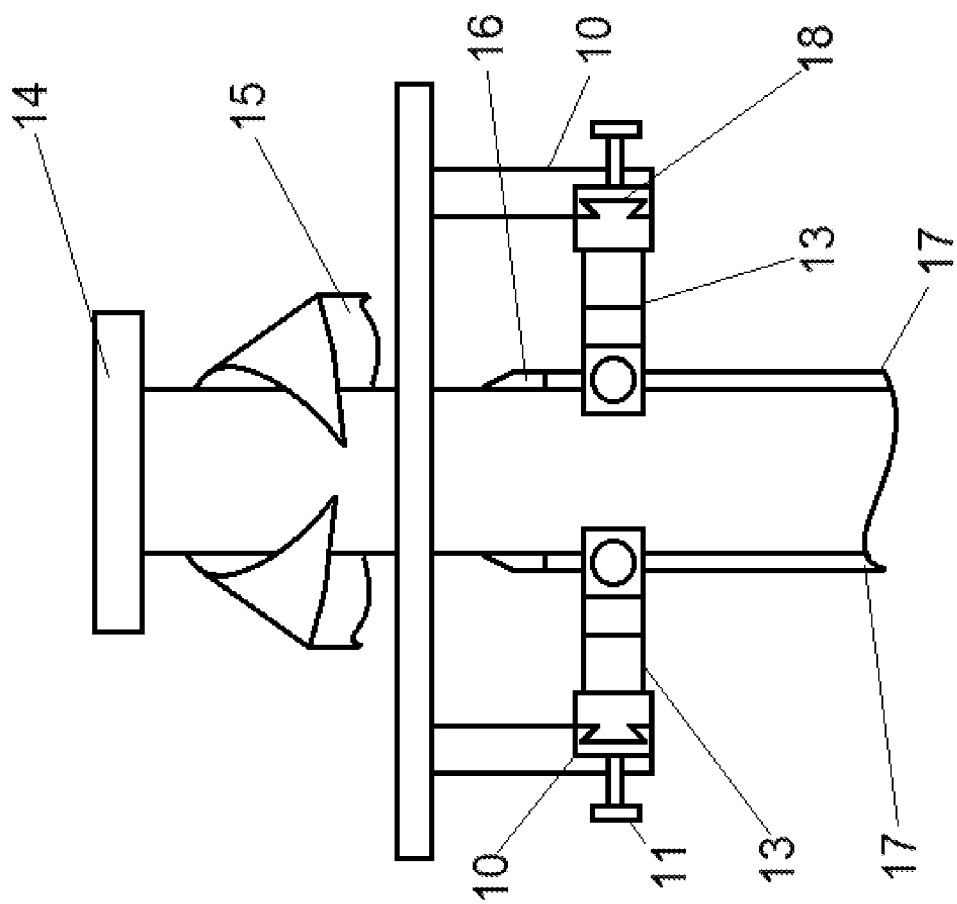

An exemplary embodiment of the proposed invention is described with reference to the drawings shown in FIG. 1—Design of exchangeable ultrasonic welding module with sectional view through the frame (top view);

FIG. 2—Position of the module in the filling tube frame (side view); and

Figure 3:
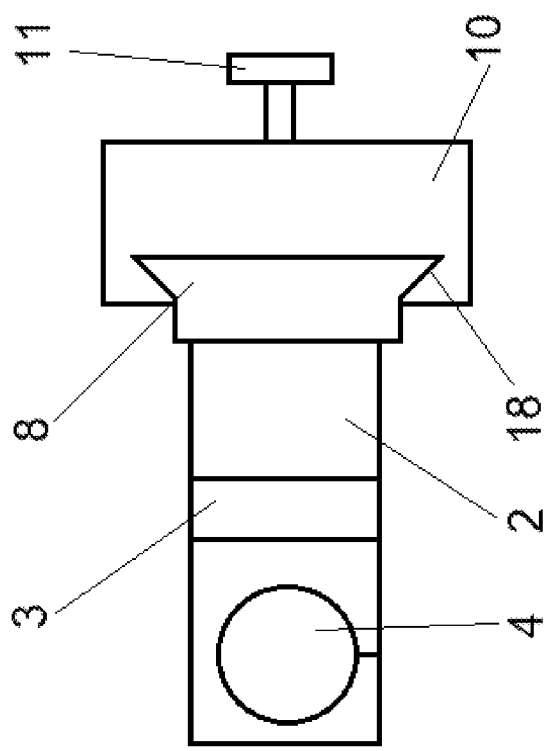

FIG. 3—Detailed view of FIG. 2 showing design of right exchangeable ultrasonic welding module with part of the frame (side view).

DETAILED DESCRIPTION

An exemplary embodiment of an exchangeable ultrasonic welding module 13 and its setting in a frame 10 of a filling tube 14 contains a member 1. Firmly affixed to the member 1 is an element 2 for linear motion of a sliding carriage 3. Firmly set on the carriage 3 is an ultrasonic transducer assembly 4 so that the horn 5 of the ultrasonic welding transducer assembly 4 is oriented opposite the anvil 7. The anvil 7 is affixed to the member 1. The movement of the carriage 3 with the ultrasonic welding transducer assembly 4 is restricted by the adjustable stop 6 of the carriage 3. The member 1 includes a guideway 8. The ultrasonic welding module's 13 guideway 8 is inserted into the guideway's 8 mating guideway 18, which is part of the frame 10 of the filling tube 14. The exact working position of the exchangeable ultrasonic welding module 13 with respect to the filling tube 14 and forming elements 16 is determined by an adjustable stop 9 of the member 1 and secured by a locking element 11. The exchangeable ultrasonic welding module 13 is provided with a combined connector 12.

An exemplary method of use of exchangeable ultrasonic welding modules 13 according to the invention comprises the following operations during exchange between filling tubes 14:

removing a complete filling tube 14 fitted with forming elements 16 and exchangeable ultrasonic welding modules 13 from a packaging machine, unlocking the locking elements 11 and sliding out the exchangeable ultrasonic welding modules 13 from the mating guideway 18 to the guideway 8, sliding exchangeable ultrasonic welding modules 13 all the way to the adjustable stop 9 into the mating guideway 18 to the guideway 8 on the second filling tube 14, placing the second filling tube 14 fitted with exchangeable ultrasonic welding modules 13 into the packaging machine.

An exemplary embodiment is clear from FIG. 1 to FIG. 3.

LIST OF REFERENCE SYMBOLS

1—member
2—element for linear motion of the carriage
3—carriage
4—ultrasonic transducer assembly
5—horn
6—adjustable stop of the carriage
7—anvil
8—guideway
9—adjustable stop
10—frame
11—locking element
12—combined connector
13—exchangeable ultrasonic welding module
14—filling tube
15—packaging film
16—forming element
17—reinforcing fold
18—mating guideway

We claim:

1. An exchangeable ultrasonic welding module for welding longitudinal reinforcing folds in packaging film inside packaging machine containing an ultrasonic transducer assembly (4) with a horn (5), wherein the horn (5) is oriented opposite an anvil (7) and the path of the film to be welded passes between them characterized in that:

it further contains a member (1) provided with a guideway (8) for guiding a sliding motion along one axis within a mating guideway (18) to the guideway (8) on a frame (10) of a filling tube (14), where the member (1) and/or the frame (10) contains a locking element (11) which secures the member (1) and the frame (10) in a fixed position relative to each other, the member (1) is provided with an element (2) for linear motion of a sliding carriage (3) and an adjustable stop (6) to restrict the carriage (3) movement, wherein the ultrasonic transducer assembly (4) is firmly affixed to the carriage (3)

and the anvil (7) is affixed to the member (1).

2. The exchangeable ultrasonic welding module according to claim 1, characterized in that the frame (10) contains an adjustable stop (9) to secure a defined position of the member (1) inserted in the mating guideway (18) to the guideway (8).

3. A method of use of the exchangeable ultrasonic welding module according to claim 1 characterized in that the exchange between tubes (14) comprises the steps:

removing a first complete filling tube (14) fitted with forming elements (16) and exchangeable ultrasonic welding modules (13) from the packaging machine, unlocking the locking elements (11) and sliding out the exchangeable ultrasonic welding modules (13) from the mating guideway (18) to the guideway (8) on the frame (10) of the first filling tube (14), sliding the exchangeable ultrasonic welding modules (13) all the way into the mating guideway (18) to the guideway (8) of a second filling tube (14), placing the second filling tube (14) fitted with forming elements (16) and exchangeable ultrasonic welding modules (13) into the packaging machine.

4. The method of use of the exchangeable ultrasonic welding module according to claim 3, characterized in that the stop in the mating guideway (18) to the guideway (8) on the frame (10) of the filling tube (14) is an adjustable stop (9).

* * * * *